United States Patent Office

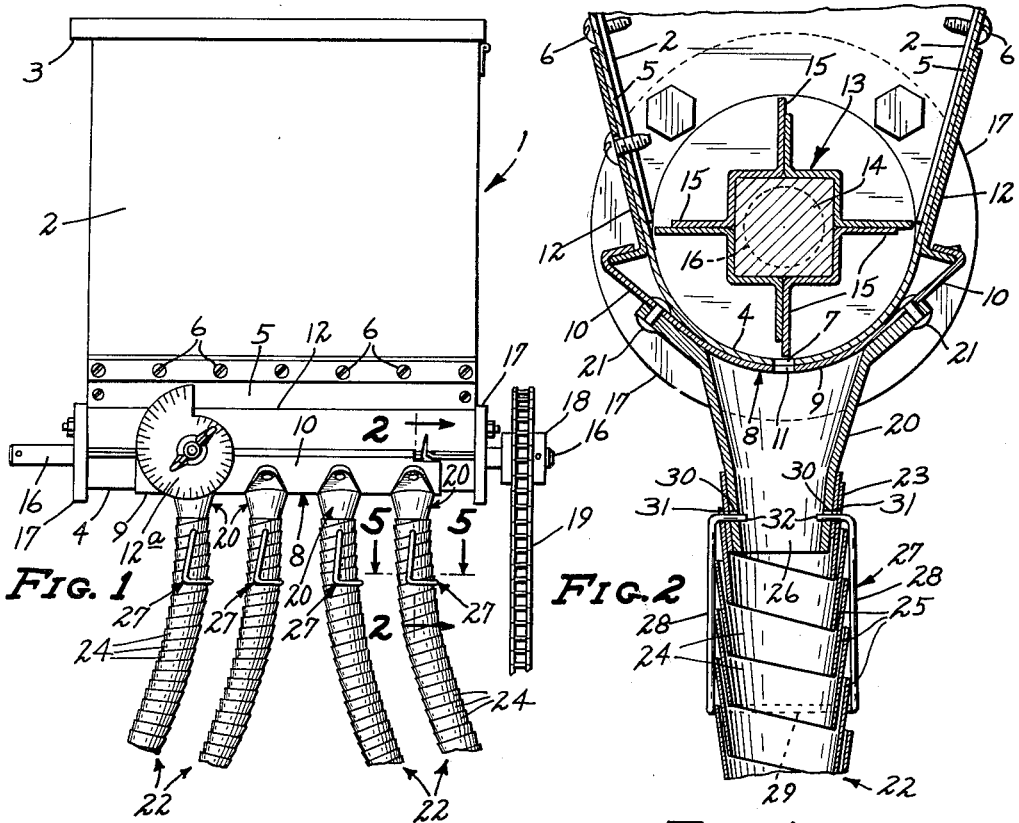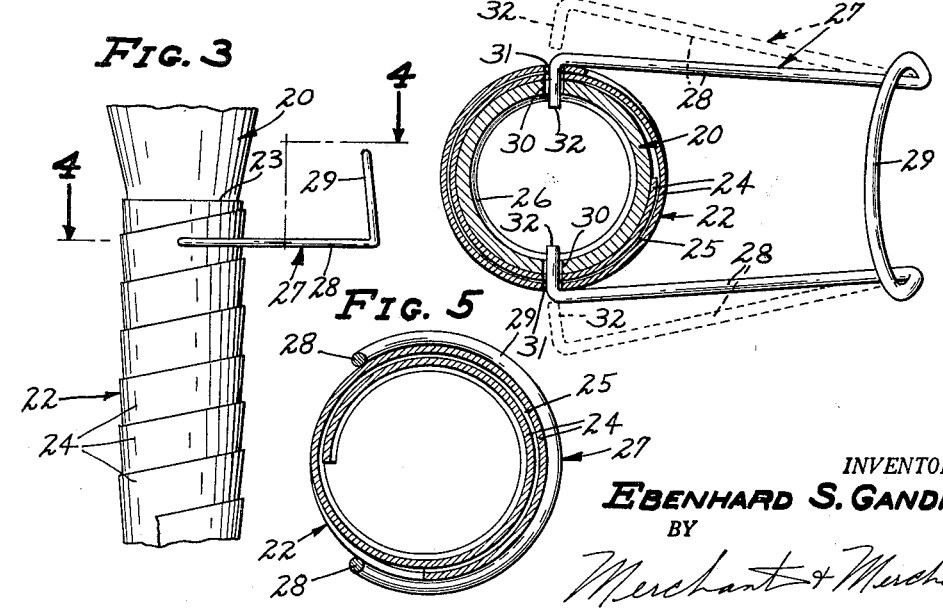

3,099,373
Patented July 30, 1963

3,099,373
FLEXIBLE FEED TUBE WITH BAIL FASTENING SAID TUBE TO A DISCHARGE SPOUT
Ebenhard S. Gandrud, Owatonna, Minn.
Filed Mar. 13, 1961, Ser. No. 95,108
2 Claims. (Cl. 222—527)

This invention relates generally to devices for spreading granular material over the ground, and more particularly it relates to a new and useful fastening bail for use in combination with a tubular delivery conduit and the hopper discharge spout of such a device for distributing granular material.

An important object of this invention is the provision of a device for distributing granular material which is equipped with a delivery conduit fastening bail which is so designed and constructed as to permit the quick and easy attachment of the flexible delivery or feed conduit to the discharge spout of the hopper.

In the application of dry granular material, such as fertilizer or seed, to the ground, it is important that the material be applied in such uniform quantity as will contribute to optimum results in crop yield. Hence, it has been found advisable, when first using a given product with a material distributing device, to calibrate the device to insure delivery of a predetermined quantity of the material for a given area traversed by the device. To accomplish this end, the delivery conduits are disconnected from the hopper and a weighing pail or pan is suspended under the discharge openings of the hopper. The machine is then moved over a measured distance, after which the discharged material is weighed. Thus the farmer can easily determine the rate of discharge to which the machine must be set or adjusted for proper distribution or application of the material.

Due to the fact that the discharge conduits must be removed and replaced at such times as are necessary, it is important that a type of fastening bail therefore be provided which may be quickly and repeatedly removed and replaced without damage to the fastening bail. Hence another important object of my invention is the provision of a resilient fastening bail having relatively long side portions enabling the same to be bent sufficiently to be disengaged from the discharge spout of the hopper and from said feed conduit, and reconnected thereto, without causing the material of the fastening bail to be distorted beyond its elastic limit.

Another object of this invention is the provision of a device for distributing granular material which is further provided with a fastening bail for the feed conduit of said device, which fastening bail is so designed and constructed as to securely retain said feed or delivery conduit in its required depending position.

Another object of this invention is the provision of a device for distributing granular material which is provided with a fastening bail for the feed conduit of said device, which fastening bail includes a clip portion which is adapted to clip on and tightly grip the outer surface of the tubular feed conduit of said device.

A further object of this invention is the provision of a device for distributing granular material which is provided with a fastening bail for the feed conduit of said device, which fastening bail does not interfere with the normal operation of said distributing device.

Another object of this invention is the provision of a device for distributing granular material which is equipped with a fastening bail for the feed or delivery conduit of said device, which fastening bail may be installed on said distributing device without the use of extra tools or equipment, and which may also be installed without the necessity of any substantial alteration of said distributing device.

Still further objects of this invention reside in the provision of a distributing device for granular material which is equipped with a fastening bail for the feed or delivery conduit of said device, which fastening bail is relatively simple and inexpensive to manufacture, is durable and rugged in construction, and is highly efficient in providing satisfactory performance of its objects and purposes.

The foregoing and other objects and advantages of this invention will become apparent from the following detailed specification, appended claims and attached drawings.

Referring to the drawings wherein like reference characters indicate like parts or elements throughout the several views:

FIG. 1 is a view in elevation of the dispensing hopper of a device for distributing granular material, and showing my invention mounted thereon, some parts being broken away;

FIG. 2 is an enlarged view in vertical section taken on the line 2—2 of FIG. 1;

FIG. 3 is an enlarged view in elevation of a portion of the device shown in FIG. 1, and showing an alternative position of my invention;

FIG. 4 is an enlarged view in horizontal section taken on the line 4—4 of FIG. 3, and showing an alternative position of my invention by dotted lines; and FIG. 5 is a view in horizontal section taken on the line 5—5 of FIG. 1.

Referring with greater particularity to the drawings, a dispensing hopper, represented generally by the reference numeral 1, is shown, the same being adapted to contain a quantity of granular material, not shown, to be dispensed by a device of the class described. Such devices are commonly used in dispensing granular material such as seeds, fertilizer, herbicides, and the like. The dispensing hopper 1 has downwardly converging side walls 2 and a hingedly connected cover 3. The dispensing hopper 1 is preferably of the type fully disclosed in my prior United States Letters Patent 2,852,166. The dispensing hopper 1 further comprises an arcuate bottom section 4, which defines tangential upwardly diverging side flanges 5 that are removably secured to the lower edge portions of the side walls 2 of the dispensing hopper 1 by means of sheet metal screws or the like 6. The arcuate bottom section 4 of the hopper 1 is provided with a plurality of longitudinally spaced discharge openings 7. For the purpose of providing metering means for determining the rate of flow of material from the hopper 1 through the discharge openings 7, an elongated gate plate 8 is provided, the same having a cross-sectionally generally arcuate bottom portion 9 and upwardly diverging wall portions 10. The elongated gate plate 8 is disposed in nesting relationship adjacent the bottom of the hopper 1 and is provided with a plurality of discharge openings 11 similar to the discharge openings 7 in the arcuate bottom section 4. The gate plate 8 is secured to the dispensing hopper 1 for longitudinal sliding movements relative thereto by means of a pair of side supporting plates 12. The desired longitudinal position of the gate plate 8 is indicated by a cam plate 12a, as disclosed in my said previous United States Patent 2,852,166.

The feeding rotor, represented generally by the reference numeral 13, is rotatably mounted in the bottom portion of the dispensing hopper 1 for agitating the granular material through the discharge openings 7, 11. The feeding rotor 13 comprises a cross-sectionally polygonal central shaft 14 and a plurality of axially extended feeding vanes 15 which project radially outwardly from the central shaft 14. The feeding rotor 13 is disposed in the hopper 1 in concentric relationship to the arcuate bottom section 4 thereof, and the radially outer edges of the feeding vanes 15 therefore have a sliding fit with the arcuate bottom section 4 of the dispensing hopper 1. The rotor shaft 14 is formed at its opposite ends to provide cross-sectionally round shaft end portions 16 which are journalled in the annular flange bushing elements 17, one each of which is secured at opposite ends of the dispensing hopper 1. As seen particularly in FIG. 1, a sprocket wheel 18 is secured to one of the end portions 16 of the rotor shaft 14, and is provided with a drive chain 19 for connection with suitable power means, not shown, whereby to provide rotation of the feeding rotor 13.

The gate plate 8 is provided with a plurality of longitudinally spaced generally funnel-like discharge spouts 20 each of which underlies a different one of the gate plate discharge openings 11 and is secured, as at 21, to the wall portion 10 of the gate plate 8. Also, a plurality of elastic flexible feed or delivery conduits, each represented generally by the reference numeral 22, are one each secured at their upper ends 23 to a different one of the discharge spouts 20. Each of the flexible conduits 22 is formed of helical wound non-elastic strip material having overlapping convolutions 24 which define spaces 25 therebetween. It is noted that the lower ends, not shown, of the flexible conduits 22 are secured to discharge heads, not shown, for distributing the granular material delivered thereby to the desired position.

For the purpose of providing means for easily and quickly attaching each of the flexible conduits 22 to the lower end 26 of a different one of the discharge spouts 20 a flexible and resilient connecting bail, represented generally by the reference numeral 27, is provided for use in combination therewith, said combination of said bail 27 comprising the present invention. Each of said bails 27 comprises a pair of elongated generally parallel side portions 28, and a generally arcuate clip portion 29 integrally connected to each of the lower ends of the side portions 28. The clip portion 29 of each of the bails 27 has an inner diameter slightly less than the outer diameter of the feed conduit 22 and also has a circumferential length of substantially more than 180°. The purpose of such construction will be particularly described hereinafter. It is noted that the lower end 26 of each of the discharge spouts 20 of the dispensing hopper 1 defines a pair of generally diametrically aligned and opposed apertures 30. Also, the upper end 23 of each of the feed or delivery conduits 22 defines a pair of generally diametrically aligned and opposed apertures 31 which are also alignable with the apertures 30 defined by each of the discharge spouts 20. In accordance with my invention, a pair of generally co-axially extending ears 32 are one each defined at the upper end of each of the side portions 28 of each of the fastening bails 27. It is noted that the ears 32 are generally laterally inwardly turned, as seen particularly in FIGS. 2 and 4. It should be obvious by reference to the drawings that the ears 32 are one each received in the aligned apertures 30, 31 of each of the discharge spouts 20 and the associated feed conduit 22, whereby to securely and quickly connect each of the flexible conduits 22 to the discharge spouts 20. FIGS. 1–3 show the ears 32 of the fastening bails 27 in said received position within the apertures 30, 31. Also, FIG. 4 shows by dotted lines the deflection of the side portions 28 of the fastening bail 27 either immediately before the ears 32 are received in the apertures 30, 31, or immediately after their removal therefrom. It is noted that the clip portion 29 of each of the fastening bails 27 is adapted to clip on and tightly grip the outer surface of the associated flexible feed conduit 22, as seen particularly in FIGS. 1, 2 and 5, in axially spaced relationship to the reception of the ears 32 within the apertures 30, 31 defined by the discharge spouts 20 and the tubular feed conduits 22. FIG. 3 shows the position of a fastening bail 27 when the clip portion 29 thereof is not in its gripping position adjacent the tubular feed conduit 22. It is noted that the clip portion 29 of each of the fastening bails 27 must necessarily be formed to define a circumferential length greater than 180° in order to provide a satisfactory gripping or clipping action, which action is enhanced by the resiliency of said clip portion 29 so as to permit the spreading thereof when the same rides over the surface of the conduit 22.

Having specifically described this invention, the operative simplicity thereof is thought to be inherently explicit in said above description of my invention. This invention has been thoroughly tested and found to be completely satisfactory for the accomplishment of the objects and advantages thereof; and while I have shown and described above a preferred embodiment thereof in which the principles of the present invention have been incorporated, I wish it to be specifically understood that the same may be modified without departure from the scope and spirit of the appended claims.

What I claim is:

1. In a device for distributing granular material, a dispensing hopper adapted to contain a quantity of said granular material, a generally tubular discharge spout secured in depending relationship to said hopper, said discharge spout defining a pair of generally diametrically aligned and opposed apertures, a flexible tubular feed conduit having its upper end associated with said discharge spout, said conduit defining a pair of generally diametrically aligned and opposed apertures which are also alignable with the apertures defined by said discharge spout, and a flexible and resilient connecting bail for securing the upper end of said conduit to said discharge spout, said bail comprising a pair of spaced and elongated generally parallel side portions, a generally arcuate clip portion integrally connected to each of the lower ends of said side portions, said clip portion of said bail having an inner diameter slightly less than the outer diameter of said conduit and also having a circumferential length of substantially more than 180° but less than 360°, and a pair of ears which extend inwardly toward one another and are one each defined at the upper end of each of said side portions of said bail, said ears being one each received in said aligned apertures of said discharge spout and said tubular conduit, and said clip portion of said bail being adapted to clip on and tightly grip an outer surface portion of said tubular conduit.

2. In a device for distributing granular material, a dispensing hopper adapted to contain a quantity of said granular material, a generally tubular discharge spout secured in depending relationship to said hopper, said discharge spout defining a pair of generally diametrically aligned and opposed apertures, a flexible tubular feed conduit having its upper end associated with said discharge spout, said conduit defining a pair of generally diametrically aligned and opposed apertures which are also alignable with the apertures defined by said discharge spout, and a flexible and resilient connecting bail for securing the upper end of said conduit to said discharge spout, said bail comprising a pair of spaced and elongated generally parallel side portions, a generally arcuate clip portion integrally connected to each of the lower ends of said side portions, said clip portion of said bail having an inner diameter slightly less than the outer diameter of said conduit and also having a circumferential length of substantially more than 180° but less than 360°, and a pair of ears which extend inwardly toward one another in generally co-axial relationship and are one each defined at the upper end of each of said side portions of said bail, said ears being one each received in said aligned apertures of said discharge spout and said tubular conduit, and said clip portion of said bail being adapted to clip on and tightly grip an outer surface portion of said tubular conduit.

References Cited in the file of this patent
UNITED STATES PATENTS

| | | |
|---|---|---|
| 2,428,679 | Oehler | Oct. 7, 1947 |
| 2,636,704 | Norberg | Apr. 28, 1953 |
| 2,861,527 | Phillips | Nov. 25, 1958 |